US 8,379,637 B2

(12) United States Patent
Ramanathan et al.

(10) Patent No.: US 8,379,637 B2
(45) Date of Patent: Feb. 19, 2013

(54) BYPASSING ROUTING RULES DURING A CONVERSATION

(75) Inventors: Rajesh Ramanathan, Redmond, WA (US); Brandon V. Taylor, Issaquah, WA (US); Pradipta Kumar Basu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1272 days.

(21) Appl. No.: 12/127,655

(22) Filed: May 27, 2008

(65) Prior Publication Data

US 2009/0296687 A1    Dec. 3, 2009

(51) Int. Cl.
*H04L 12/66* (2006.01)
*H04M 3/42* (2006.01)

(52) U.S. Cl. ............... 370/356; 379/201.07; 379/201.08; 379/201.1; 379/210.02

(58) Field of Classification Search .................. None
See application file for complete search history.

(56) References Cited

U.S. PATENT DOCUMENTS

| | | | |
|---|---|---|---|
| 5,654,961 A | 8/1997 | Araujo et al. ................ 370/263 |
| 5,848,142 A | 12/1998 | Yaker ............................ 379/215 |
| 6,745,040 B2 | 6/2004 | Zimmerman ................ 455/458 |
| 6,912,581 B2 | 6/2005 | Johnson et al. .............. 709/228 |
| 7,136,475 B1 | 11/2006 | Rogers et al. ............. 379/213.01 |
| 2002/0093948 A1* | 7/2002 | Dertz et al. .................. 370/355 |
| 2003/0117999 A1* | 6/2003 | Abrams et al. ............... 370/352 |
| 2007/0033249 A1 | 2/2007 | Samdadiya et al. .......... 709/204 |
| 2007/0036284 A1 | 2/2007 | Raghav et al. ............. 379/67.01 |
| 2007/0121914 A1* | 5/2007 | Pearson et al. ........... 379/355.07 |
| 2007/0172042 A1* | 7/2007 | Winikoff et al. ......... 379/142.05 |

OTHER PUBLICATIONS

Wayne Wobcke, et al.; "A Call Handling Assistant for Mobile Devices"; http://www.cse.unsw.edu.au/~wobcke/papers/nymity.pdf; 4 pgs.

* cited by examiner

*Primary Examiner* — Melanie Jagannathan
(74) *Attorney, Agent, or Firm* — Merchant & Gould

(57) ABSTRACT

Communication requests added to a conversation are routed directly to a user without following the pre-configured routing rules for the user during a breakthrough period. The breakthrough period may last for the duration of the conversation or for some other period of time. A conversation may be initiated using any supported type of communication. For example, if a user initially sets up an IM conversation with a remote user, then when a voice call is made to the user from the remote user, the voice call is routed directly to the user without applying the routing rules that are configured for the user. Once the breakthrough period has elapsed, the routing rules become active again and are applied to communications received from the remote user that are directed to the user.

20 Claims, 3 Drawing Sheets

BYPASSING ROUTING RULES DURING A CONVERSATION

BACKGROUND

Users of many communications systems are able to configure handling rules for communications that they receive. For example, a user may forward their calls to one or more other users, route their Instant Messaging (IM) Communications to themselves, set a Do Not Disturb setting, and the like. Any communication that is received by the communication follows the established rules.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Communication requests added to an existing conversation are routed directly to a user without following the user's pre-configured routing rules during a breakthrough period. The breakthrough period may last for the duration of the conversation or for some other period of time. A conversation may be initiated using any supported type of communication. For example, if a user initially sets up an IM conversation with a remote user, then when a voice call is made to the user from the remote user, the voice call is routed directly to the user without applying the routing rules that are configured for the user. Once the breakthrough period has elapsed, the routing rules become active again and are applied to communications received from the remote user that are directed to the user.

DETAILED DESCRIPTION

Figure 1:
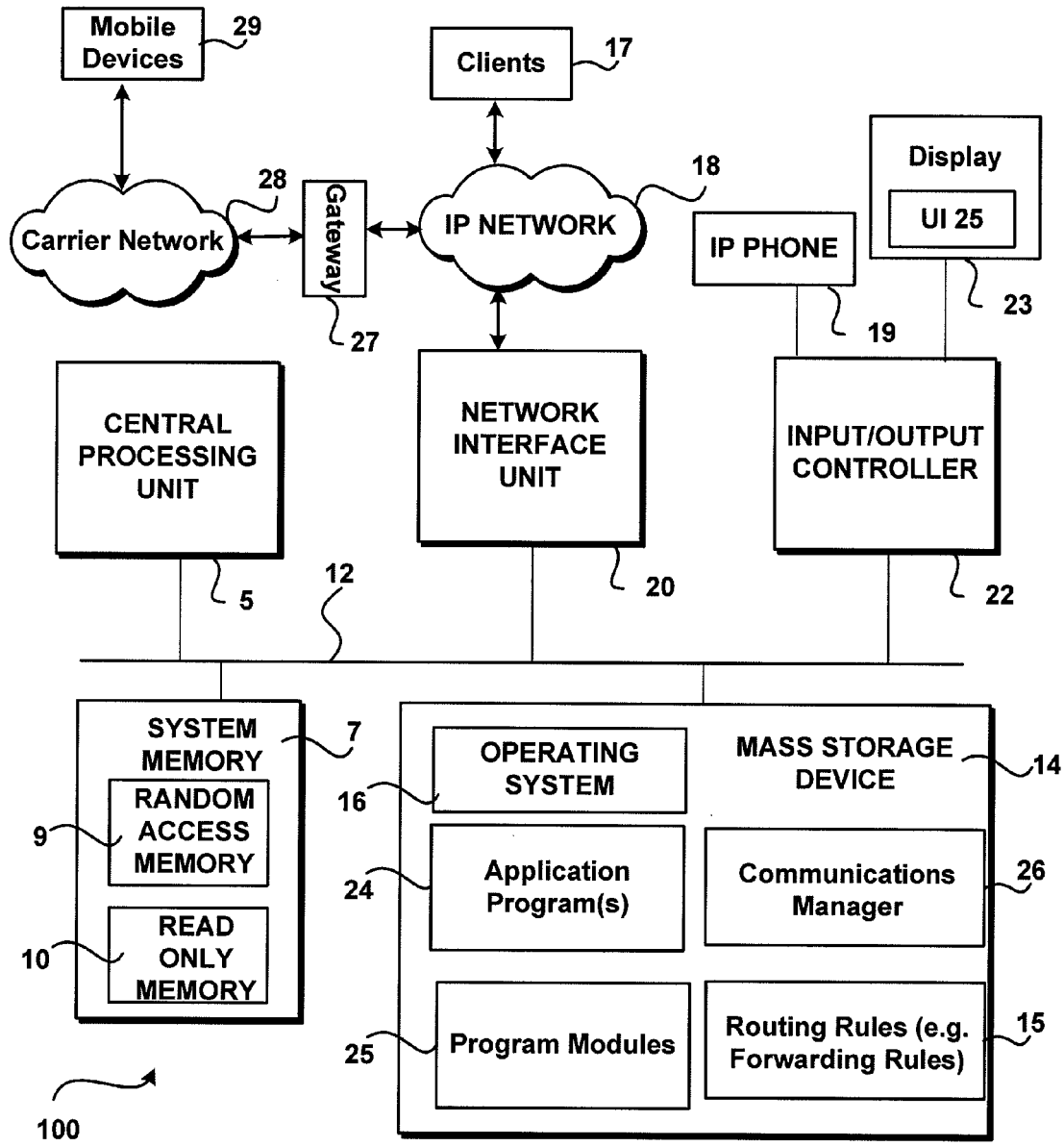
FIG. 1 illustrates an exemplary computing environment.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer environment for a computer 100 utilized in the various embodiments will be described. The computer environment shown in FIG. 1 may be configured as a server, a desktop or mobile computer, or some other type of computing device and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, application program(s) 24, other program modules 25, and communication manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide input/output to an IP phone 19, a display screen 23, a printer, or other type of output device.

Carrier network 28 is a network responsible for communicating with mobile devices 29. The carrier network 28 may include both wireless and wired components. For example, carrier network 28 may include a cellular tower that is linked to a wired telephone network. Typically, the cellular tower carries communication to and from mobile devices, such as cell phones, notebooks, pocket PCs, long-distance communication links, and the like.

Gateway 27 routes messages between carrier network 28 and IP Network 18. For example, communications manager 26 may route a call or some other message to a mobile device on carrier network 28 and/or route a call or some other message to a user's device on IP network 18. Gateway 27 provides a means for transporting the communication from the IP network to the carrier network. Conversely, a user with a device connected to a carrier network may be directing a call to a client on IP network 18.

As mentioned briefly above, a number of program modules and data files may be stored in the mass storage device 14 and RAM 9 of the computer 100, including an operating system 16 suitable for controlling the operation of a computer, such as WINDOWS SERVER® or the WINDOWS VISTA® operating system from MICROSOFT CORPORATION of Redmond, Wash. The mass storage device 14 and RAM 9 may also store one or more program modules. In particular, the mass storage device 14 and the RAM 9 may store one or more application programs 24 and program modules 25. Communications manager 26 is configured to bypass routing rules that are associated with a user during a breakthrough period. Generally, incoming communications to a user from a remote user are automatically directed to the user without applying the user's routing rules (e.g. routing rules 15) during the breakthrough period. According to one embodiment, the breakthrough period is the time when the user and remote user remain in a conversation using at least one available communication modality (i.e. voice, Instant Messaging, and the like). Other time periods may be used for the breakthrough period. For example, the breakthrough period may last for a fixed time period, such as: 5 minutes, 10 minutes, 30 minutes, 1 hour, 1 day, and the like. Additionally, a breakthrough period may be established for each new communication between the user and the remote user. Once the breakthrough period has elapsed, the communication manager 26 applies the routing rules 15 to route the remote user's incoming communications to the user. For example, the routing rules may specify to route an incoming call from the remote user to the user's assistant or some other designated individual(s).

User Interface 25 may be utilized to configure the routing rules as well as specify the user's that are allowed to breakthrough in response to an established conversation between user's.

According to one embodiment, communications manager 26 communicates with an application program 24 such as MICROSOFT's OFFICE COMMUNICATOR®. While communications manager 26 is illustrated as an independent program, the functionality may be integrated into other software and/or hardware. The operation of communications manager 26 is described in more detail below.

Figure 2:
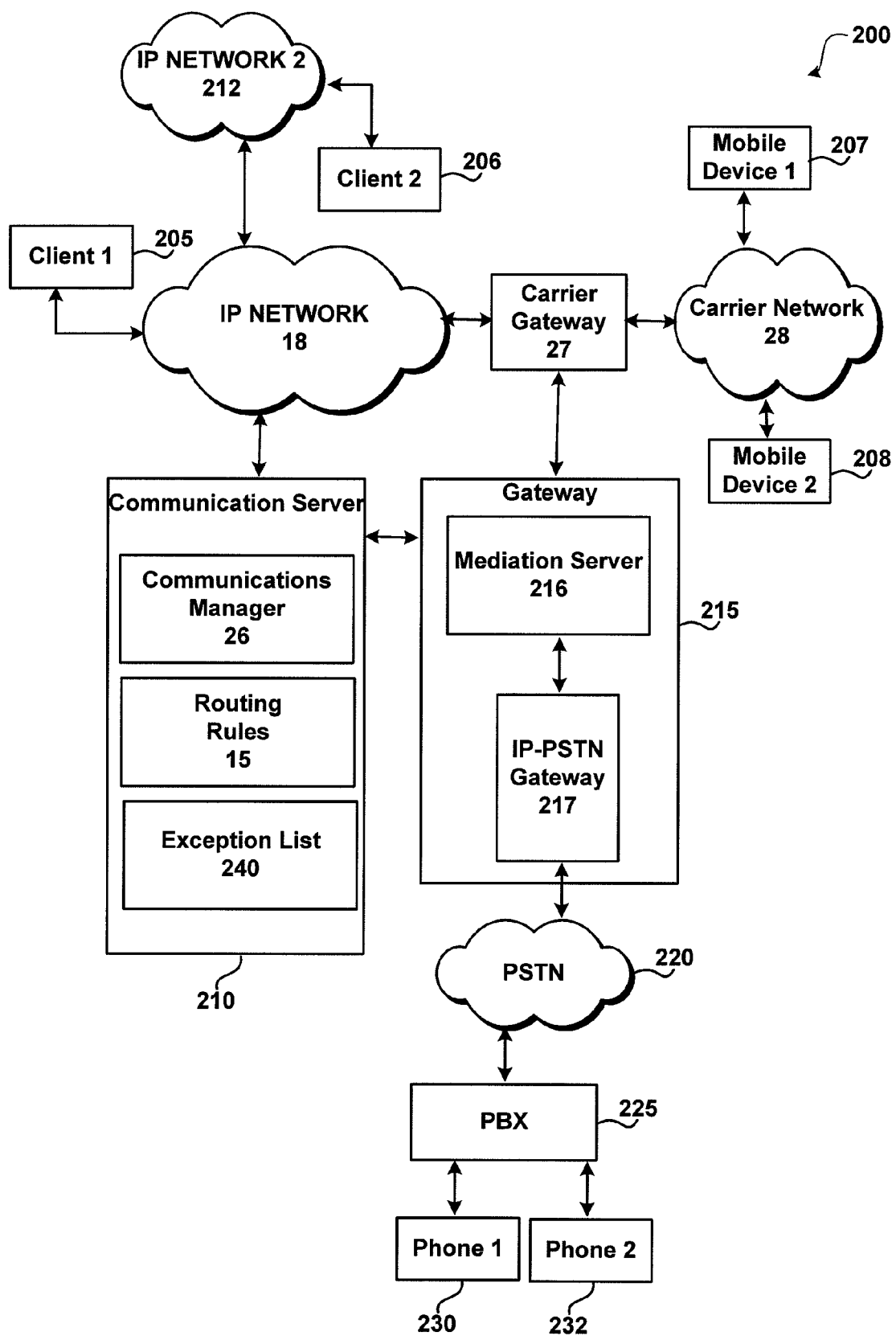
FIG. 2 shows a communications system for bypassing routing rules during a conversation.

FIG. 2 shows a communications system for bypassing routing rules during a conversation. As illustrated, system 200 includes client 1 (205) that is coupled to IP Network 18, client 2 (206) that is coupled to IP Network 2 (212), mobile device 1 (207) and mobile device 2 (208) that are coupled to carrier network 28, communication server 210 including communications manager 26, carrier gateway 27, gateway 215, mediation server 216, IP-PSTN gateway 217 coupled to PBX 225 through PSTN 220 and phone 1 (230) and phone 2 (232).

The communications server 210 and communications manager 26 are configured to route incoming calls to the appropriate destinations. According to one embodiment, routing settings that are configured on a client device determines how to route the incoming calls. For example, a client device may specify what number(s) to call when an incoming call is directed to one or more of the client's telephone numbers. Routing rules 15 may also be stored on a communication server 210 or at some other location. Routing communication within system 200 may be done different ways. For example, a telephone number may be mapped to a Session Initiation Protocol (SIP) Uniform Resource Indicator (URI) using a Reverse Number Lookup (RNL) process. By performing reverse number lookup, the server 210 can route calls to endpoints associated with a particular user's SIP Uniform Resource Identifier (URI). The server may also utilize call authorization rules configured by an administrator to route each call to the appropriate media gateway (i.e. carrier gateway 27, IP-PSTN gateway 217). According to one embodiment, communications server 210 utilizes SIP. For more information on this industry standard protocol see IETF RFC 3261 which may be found at http://www.ietf.org/rfc/rfc3261.txt. Generally, SIP defines a standard for session setup, termination, and media negotiation between two parties that is widely used for Voice-over-IP (VoIP) call signaling.

Organizations that conduct business in more than one geographic location require some way to translate identical phone number strings into numbers that are valid for each location. A traditional Private Branch Exchange (PBX) maintains separate numbering plans for each location. When a PBX system receives a call to a particular user extension, there is no ambiguity about the appropriate destination since the PBX system is configured only for the site where it is deployed. Using an Enterprise Voice infrastructure, however, is quite different. Unlike the site-specific PBX infrastructure, the Enterprise Voice infrastructure is distributed across the enterprise network. In an Enterprise Voice distributed infrastructure, location profiles may be used to create a dialing experience similar to site-specific PBX infrastructures in which a number string is translated according to the locale from which it is dialed. A location profile is a named set of normalization rules that translate phone numbers for a named location to a single standard (E.164) format for purposes of phone authorization and call routing. The normalization rules define how phone numbers expressed in various formats will be routed for the named location. The same number string may be interpreted and translated differently depending on the locale from which it is dialed.

The communication server 210 using communications manager 26 routes calls to endpoints on the IP network (IP-IP calls); routes calls to the public switched telephone network (PSTN)/PBX (IP-PSTN calls) and may also route calls to destinations using other networks, such as a carrier network. The communication server may be coupled to the networks through one or more gateways. A gateway translates signaling and media between the network and the IP voice infrastructure. The gateway 215 may be composed of one or more devices. For example, the gateway 215 may be implemented as a mediation server 216 and an IP-PSTN gateway 217 or the functionality of the mediation server and the IP-PSTN may be included within the gateway as illustrated. Generally, IP-PSTN gateway 217 is a gateway that is located between a landline phone (i.e. phone 1 or phone 2) and any SIP User Agent Client (i.e. client 1 or client 2). Gateway 217 allows a person to call any (allowed) telephone number from any SIP-compliant client application.

Mediation Server 216 provides signaling and media translation between the VoIP infrastructure and a gateway. Mediation Server 216 also links the Communication Server 210, such as Microsoft's Office Communications Server 2007®, with a PBX 225. On the communications server side, the media server 216 listens on a mutual TLS transport address. TLS (Transport Layer Security), is a protocol for establishing a secure connection between a client and a server. TLS (Transport Layer Security) is capable of authenticating both the client and the server and creating a encrypted connection between the two. The TLS (Transport Layer Security) protocol is extensible, meaning that new algorithms can be added for any of these purposes, as long as both the server and the client are aware of the new algorithms. On the gateway side, mediation server listens on a single TCP/IP transport address. Generally, the mediation server 216 is configured for: translating SIP over TCP (on the gateway side) to SIP over mutual TLS (on the Enterprise Voice side); encrypting and decrypting SRTP (Secure Real-time Transport Protocol) on the communications server side; translating media streams between the communications server and the gateway; connecting clients that are outside the network to internal ICE (Interactive Connectivity Establishment) components, which enable media traversal of NAT and firewalls; and acting as an intermediary for call flows that a gateway does not support, such as calls from remote workers on an enterprise voice client.

Communications server 210 may be configured to provide communication services for one or more locations. For example, communications server 210 may be utilized for a business having branch offices that are connected using IP Network 18 and/or other IP networks (e.g. IP Network 2 (212)). For example, Client 2 may be located at a branch office while communication server 210 is located at the main office. Communications manager 26 is configured to route incoming communications based on the established routing rules 15 for a user as well as determine when to bypass the routing rules for a user during a breakthrough period. The routing rules 15 may establish many different types of communication rules. For example, a user may configure call handling rules such as forwarding their calls to another user or set of users or set a delegate rule that sends all incoming calls to a delegate. Setting these call forwarding rules without bypassing these rules at some points, however, can interfere with adding different communications and/or modes to an existing conversation. For example, consider a manager who has a delegate configured in their routing rules. Suppose now that the manager initiates a conversation using IM with a remote user. When the remote user attempts to add another communication, such as voice to the conversation, then the voice call would be redirected to the delegate based on the established routing rules (instead of ringing the manager where the routing rules to be ignored.) Effectively, the original mode of communication (e.g. IM) continues whereas the other modes such as voice or video are rerouted according to the call handling rules. Similar other situations arise when a user has set Do Not Disturb rules because he or she does not want to be interrupted by others when having an ongoing IM conversation with a remote user. Now when the remote user attempts to add other modes of communication to the conversation, such as voice, the other mode is rejected because the user's presence state is set to Do Not Disturb. Bypassing these rules during ongoing conversations between users assists in integrating these other modes of communication into an existing conversation.

According to one embodiment, the routing rules 15 are bypassed for a remote user during a conversation between the user and the remote user when the user has designated the remote user as an exception. An exception is a user that has been authorized to directly contact the user after an initial conversation has been established between the exception and the user. The exceptions within the list include user(s) that are allowed to breakthrough a user's routing rules during a conversation. For example, the exception list may include a set of users that may always breakthrough (bypass the preset routing rules) when they are in a conversation with the user. The exceptions may be stored within an exception list either permanently or temporarily. For instance, the user may be added for a single conversation (e.g. at the time of the conversation) or be included in the exception list 240 until removed.

The following example of bypassing routing rules for a breakthrough period is intended to be non-limiting. Suppose now that upon the manager accepting a request to instant-message with a remote user (who is in the exception list 240), the communication server is informed to bypass the routing rules 15 for communications received from the remote user. The routing rules are ignored for the remote user since once the manager has expressed their intent to communicate with the remote user, they will want to take all calls from this particular user and not want the delegate (or other designees) to handle the other communications initiated during the active conversation. Now, if the remote user adds audio to the conversation or starts a different audio conversation with the manager, the call goes directly to the manager without being routed according to the routing rules. The routing rules are ignored for a period of time (breakthrough period). This breakthrough time period can be defined by the time starting from which the user (in this case the manager) started actively participating in a conversation with the remote user, say an IM conversation and ending when the IM conversation is over. Once the IM conversation is over, the Communication Server 210 removes the user from the exception list 240 and the breakthrough permission for that user is now void.

According to another embodiment, a user may authorize another communication to be added to a conversation by "signing" the conversation with a signature that is unique to the active conversation. Any new communication that is added to the conversation carries the unique signature, which when received by the communication server 210 allows(s) the incoming mode of communication as an exception. Users could also exchange tokens in an existing conversation using SIP handshake (such as invite/200 OK, followed by MESSAGE/200 OK or INFO/200 OK) can be used to allow subsequent mode additions to bypass the routing rules on the communication server.

According to one embodiment, the communication application on the client uses the SERVICE request in the SIP protocol to set the routing rules for the user on the Communication Server 210. According to one embodiment, the rules are specified in an XML document sent in the body of the SERVICE request. Similar SERVICE requests with a revised XML document are used to update the user's routing rules with the exception or breakthrough list when the manager's client is in an IM conversation with a remote party and wants to put that remote party to the exception list. Once the IM conversation is over, the same SERVICE request is used to update the routing rules with a revised XML document having that remote party removed from the exception list. In order to differentiate between calls on behalf of manager and calls on behalf of huntgroups and other similar scenarios the header of the SERVICE request includes a parameter describing the reason for the representation session, e.g. P-Session-On-Behalf-Of: marco@contoso.com; reason=delegation; P-Session-On-Behalf-Of:helpdesk@contoso.com; reason=huntgroup. While joining a conference on behalf of manager Marco, the INVITE from Mindy to the conference controller i.e. the focus will have the same header to denote the on-behalf-of relationship. Once Mindy is inside the conference, for other users in the conference, the information about Mindy's representation will be conveyed by the conference document sent in the BENOTIFY sent to all the conference participants from the focus itself. This information is part of the user properties of Mindy in the conference.

A new SIP transaction (INVITE) with a different mode can be initiated using the signed Conversation ID from the previous mode that includes the timestamp as well. If the new INVITE lies within a reasonable time difference (say 5 minutes), the server makes a check of the Conversation ID and the associated signature and timestamp to verify that there is an ongoing conversation. If the proposed conversation ID is valid, the communication server sends an out of band INFO to validate the conversation is currently active to the clients. If any one of the client verifies that the conversation exists, then the server lets the new mode through to the client without applying any call routing rules.

Figure 3:
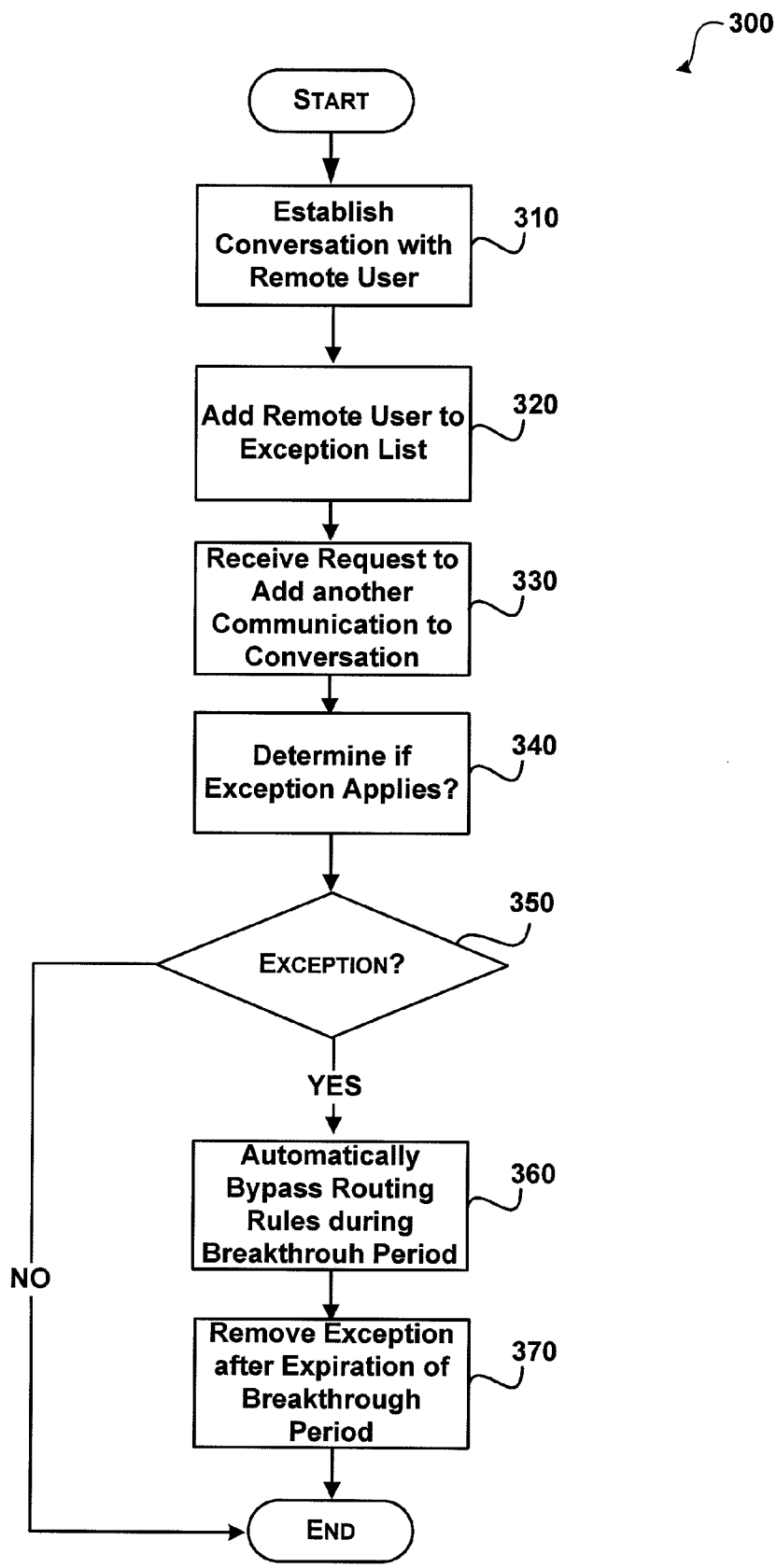
FIG. 3 shows an illustrative process for bypassing routing rules during a conversation.

Referring now to FIG. 3, an illustrative process 300 for automatically bypassing routing rules during a conversation will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process flows to operation 310, where a conversation is established between at least two users. The conversation may be any type of supported communication mode. For example, the conversation may be an IM conversation, a video conversation, a voice conversation, and the like. A conversation is established with a remote user when the user accepts the communication request from the remote user(s).

Moving to operation 320, the remote user is added to an exception list when the user desires to have secondary communications with the remote user bypass the user's routing rules. According to one embodiment, the determination of what user(s) to include in the exception list are predetermined by the user. For example, the user maintains a list of user(s) to be included in the exception list. According to another embodiment, the remote user may be added on a conversation by conversation basis. For example, the user may specify at the acceptance of the initial conversation to include the remote user in the exception list.

Moving to operation 330, an additional request is made from the remote user to the user to add another communication to the existing conversation. For example, the additional communication may be a different mode of communication as compared to the mode of communication used to establish the conversation (e.g. a voice call when an IM session is the initial mode). The additional communication could also be the same mode of communication.

Transitioning to operation 340, a determination is made as to whether an exception applies. According to one embodiment, an exception applies when the remote user is specified to be excluded. According to another embodiment, an exception applies when specified within the INVITE message.

At decision operation 350, when an exception does not apply the process flows to an end block. When an exception does apply, the process flows to operation 360 where the routing rules that normally would apply to communications from the remote user are bypassed during a breakthrough period. As discussed, the breakthrough period is based on the period of time the initial conversation remains active. Other periods of time, however, may be utilized. For example, the breakthrough period may be based on a fixed period of time or be based on when the last communication within the conversation ends.

Flowing to operation 370, the exception is removed after the expiration of the breakthrough period. The process then flows to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for automatically bypassing routing rules used in an Voice over Internet Protocol (VoIP) network, comprising:
    establishing a conversation between user and a remote user using a first method of communication; wherein at least the user is on the VoIP network and wherein the user includes routing rules that when applied route incoming communications from the remote user to a delegate;
    receiving a second incoming communication from the remote user directed to the user during the conversation;
    determining when to bypass the routing rules for the user during the conversation;
    bypassing the routing rules during the conversation when determined such that the second incoming communication from the remote user is routed directly to the user while the conversation remains established; and
    routing the second communication directly to the user.

2. The method of claim 1, further comprising bypassing the routing rules for a breakthrough period.

3. The method of claim 2, wherein the breakthrough period is a period of time while the conversation remains established.

4. The method of claim 1, wherein the breakthrough period is a period of time defined by the user.

5. The method of claim 1, further comprising maintaining an exception list that includes users that are authorized to breakthrough the routing rules established by the user.

6. The method of claim 1, wherein determining when to bypass the routing rules comprises determining when the remote user is included as an exception.

7. The method of claim 1, wherein determining when the remote user is an exception comprises determining when the second communication is signed by the user.

8. The method of claim 1, further comprising updating an exception list in response to establishing the conversation between the user and the remote user.

9. The method of claim 2, further comprising applying the routing rules after the breakthrough period has elapsed.

10. A computer-readable storage medium device having computer-executable instructions for automatically bypassing routing rules, comprising:
    receiving an incoming communication at a communications server; wherein the communication is from a remote user that is destined for a user on an IP network;
    routing the incoming communication to the user based on routing rules for the user;
    determining when a conversation is established between the user and the remote user using a first mode of communication;
    receiving a second incoming communication from the remote user directed to the user during the conversation;
    bypassing the routing rules for the user such that the second incoming communication from the remote user is routed directly to the user while the conversation remains established; and
    routing the second communication directly to the user.

11. The computer-readable storage medium device of claim 10, further comprising bypassing the routing rules for a breakthrough period; wherein the breakthrough period is a period of time while the conversation remains established.

12. The computer-readable storage medium device of claim 10, further comprising maintaining an exception list on the communication server that includes users that are authorized to breakthrough the routing rules established by the user.

13. The computer-readable storage medium device of claim 12, further comprising updating the exception list in response to establishing the conversation between the user and the remote user.

14. The computer-readable storage medium device of claim 10, wherein the second incoming communication utilizes a second mode of communication.

15. The computer-readable storage medium device of claim 10, further comprising determining when the second communication is signed by the user; and when signed automatically bypassing the routing rules.

16. A system for automatically bypassing routing rules during a VoIP session, comprising:
   a data store that is configured to store routing rules that when applied to an incoming communication determine when to route the incoming communication to a different user compared to a primary destination the incoming communication is directed;
   a network connection that is configured to connect to the IP network;
   a processor and a computer-readable medium;
   an operating environment stored on the computer-readable medium and executing on the processor; and
   a communications manager operating under the control of the operating environment and operative to:
      receive an incoming call from a remote user on the IP network;
      accept the incoming call;
      establish a conversation with the remote user using a first mode of communication using routing rules; and
      receive a second incoming communication from the remote user during the conversation; wherein the second incoming communication bypasses the routing rules and is routed directly to the primary destination while the conversation remains established.

17. The system of claim 16, further comprising bypassing the routing rules for a breakthrough period; wherein the breakthrough period is a period of time the conversation remains established.

18. The system of claim 16, further comprising updating an exception list on the communication server after the conversation is established; wherein the exception list includes users that are authorized to breakthrough the routing rules.

19. The system of claim 16, wherein the second incoming communication utilizes a second mode of communication.

20. The system of claim 16, further comprising determining when the second communication is signed by the primary destination; and when signed, automatically bypassing the routing rules.

* * * * *